(12) United States Patent
Asai (10) Patent No.: US 6,825,947 B1
(45) Date of Patent: Nov. 30, 2004

(54) INTERNET FACSIMILE MACHINE USED IN LOCAL NETWORK SYSTEM

(75) Inventor: Kazunobu Asai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/276,819

(22) Filed: Mar. 26, 1999

(30) Foreign Application Priority Data

Mar. 27, 1998 (JP) ............................................ 10-100645

(51) Int. Cl.$^7$ ............................................ G06F 13/00
(52) U.S. Cl. ...................... 358/1.18; 358/402; 358/407; 358/434; 379/100.01
(58) Field of Search .............................. 358/402, 438, 358/440, 434, 1.15, 1.16, 407, 442; 379/100.01, 100.12, 93.23, 93.24, 93.31, 100.08, 100.09, 900, 905

(56) References Cited

U.S. PATENT DOCUMENTS

| | | | | |
|---|---|---|---|---|
| 5,014,300 A | * | 5/1991 | Harvath et al. | 379/100.09 |
| 5,339,156 A | * | 8/1994 | Ishii | 358/402 |
| 5,448,626 A | * | 9/1995 | Kajiya et al. | 379/88.13 |
| 5,767,985 A | * | 6/1998 | Yamamoto et al. | 358/402 |
| 5,798,845 A | * | 8/1998 | Baek et al. | 358/434 |
| 5,805,298 A | * | 9/1998 | Ho et al. | 358/402 |
| 5,881,233 A | * | 3/1999 | Toyoda et al. | 709/233 |
| 5,991,290 A | * | 11/1999 | Malik | 370/352 |
| 6,005,677 A | * | 12/1999 | Suzuki | 358/442 |
| 6,043,902 A | * | 3/2000 | Sato | 358/434 |
| 6,052,445 A | * | 4/2000 | Bashoura et al. | 379/100.14 |
| 6,088,125 A | * | 7/2000 | Okada et al. | 358/405 |
| 6,097,797 A | * | 8/2000 | Oseto | 379/100.08 |
| 6,101,244 A | * | 8/2000 | Okada | 379/100.08 |
| 6,137,597 A | * | 10/2000 | Kanaya | 358/402 |
| 6,144,462 A | * | 11/2000 | Kaplan | 358/405 |
| 6,157,706 A | * | 12/2000 | Rachelson | 379/100.08 |
| 6,266,160 B1 | * | 7/2001 | Saito et al. | 358/407 |
| 6,335,966 B1 | * | 1/2002 | Toyoda | 379/100.06 |
| 6,374,291 B1 | * | 4/2002 | Ishibashi et al. | 709/206 |
| 6,404,513 B1 | * | 6/2002 | Denker | 358/407 |
| 6,417,930 B2 | * | 7/2002 | Mori | 358/1.15 |
| 6,470,379 B1 | * | 10/2002 | Mori | 709/206 |

FOREIGN PATENT DOCUMENTS

EP        0940967    *  9/1999    ............ H04N/1/00

* cited by examiner

*Primary Examiner*—Mark Wallerson
(74) *Attorney, Agent, or Firm*—Oliff & Berridge, PLC (57) ABSTRACT

When the CPU determines in S308 that a user of the facsimile machine is indicated, then local user specific data indicating the local user indicated in S308 is stored in ROM in S310. In S314, image is retrieved from a document. In S318, an e-mail message with the local user specific data registered as the transmission source is prepared. In S320, the CPU dials up the SMTP server and in S324, the CPU transmits the e-mail message. Accordingly, the remote user can return e-mail message to the user registered on the received e-mail message. The local user can receive the return e-mail message on his or her personal computer.

18 Claims, 11 Drawing Sheets

DESTINATION DATA TABLE  33a

|  | REMOTE USER NAME | FAX NUMBER | REMOTE USER'S E-MAIL ADDRESS |
|---|---|---|---|
| No.1 | Mr. A. Doe | 033-123-4567 | abc.@def.or.jp |
| 2 | Mr. B. Doe | 052-987-6543 | 123.@ghi.or.jp |
| ⋮ | ⋮ | ⋮ | ⋮ |
| 100 | Mr. C. Doe | 012-345-6789 | xyz.@abc.or.jp |

FIG.4(b)

USER SPECIFIC DATA TABLE  33b

|  | USER NAME | FAX NUMBER | USER E-MAIL ADDRESS |
|---|---|---|---|
| No.1 | ○○○ | 052-456-7890 | def.@abc.or.jp |
| 2 | □□□ | 052-456-7890 | 456.@ghi.or.jp |
| ⋮ | ⋮ | ⋮ | ⋮ |
| 12 | △△△ | 052-456-7890 | 789.@abc.or.jp |

FIG.4(c)

LOCAL DEVICE IDENTIFICATION DATA TABLE  33c

| TRANSMITTER NAME | FAX NUMBER | E-MAIL ADDRESS |
|---|---|---|
| ○○○ | 052-458-0001 | brt.@abc.or.jp |

FIG.4(d)

ROM  31

INTERNET FACSIMILE MACHINE USED IN LOCAL NETWORK SYSTEM

BACKGROUND OF THE INVENTION

1. Field of the Invention

The present invention relates to a facsimile machine, a facsimile system including a plurality of facsimile machines connected by a transmission network, and a memory medium storing a computer program for controlling facsimile machine.

2. Description of the Related Art

Conventionally, there has been known a local facsimile machine with a function for storing facsimile numbers of remote facsimile machines, and also a function for storing personal information about the local facsimile machine itself, such as a user name, a company name, and a facsimile number of the local facsimile machine.

Such a conventional facsimile machine transmits image information, which has been retrieved from an original document, to a remote facsimile machine over a public transmission exchange network. At this time, the local facsimile machine also transmits personal information about the local facsimile machine with the image information. As a result, a user of the remote facsimile machine can know the personal information identifying the local facsimile machine. For example, the remote facsimile machine can print the image information and the personal information on the same recording sheet. Alternatively, the remote facsimile machine can display the personal information on a display unit. Then, the user of the remote facsimile machine can prepare and send a reply message to the local facsimile machine if necessary.

However, in many office situations a single facsimile machine is connected to a plurality of personal computers. Each computer is assigned to a separate user, but the single facsimile machine is shared by all the users. When the a user of one of the personal computers transmits image information to a remote facsimile machine using the local facsimile machine, the local facsimile machine transmits its own personal information, rather than personal information about the user, with the image information. Therefore, a user of the remote personal computer may transmit a reply message addressed merely to the local facsimile machine, so that the users of the local facsimile machine will have no way of knowing who the message in intended to reach.

SUMMARY OF THE INVENTION

It is an objective of the present invention to overcome the above problems and also to provide a facsimile device, a facsimile system, and a recording medium, capable of registering additional personal information different from personal information about a facsimile machine itself and capable of transmitting the additional personal information along with image information to a remote facsimile device.

In order to achieve the above and other objectives, there in provided a facsimile device communicable with remote devices. The facsimile device includes a scanner that reads image information from an original document, a destination specifying unit that specifics one of the remote devices as a destination, a user specifying unit that specifies a user, a user information generating unit that generates user information identifying a user when the user specifying unit specifies the user, a transmission unit that transmits the image information with the user information to the destination specified by the destination specifying unit.

There is also provided a communication system including at least one computer, a facsimile device operatively connected to the at least one computer, and at least one terminal device communicable with the facsimile device. The facsimile device includes an image information generating unit that generates image information, a terminal device specifying unit that specifies one of the at least one terminal device, a sender specifying unit that specifies one of the at least one computer, a sender information generating unit that generates sender information identifying the computer specified by the sender specifying unit, and a transmission unit that transmits the image information with the sender information to the terminal device specified by the terminal device specifying unit. Each of the at least one terminal device includes a receiving unit that receives the image information and the sender information transmitted from the facsimile device, and a reply unit that automatically prepares a response message and transmits the response message to the computer identified by the sender information. Each of the at least one computer includes a receiving unit that receives the reply message transmitted from the terminal device.

Further, there is provided a medium storing a program of controlling a facsimile device. The program includes programs of designating a destination, selecting one of sender information and device identification information, the sender information identifying a computer connected to the facsimile device, the device identification information identifying the facsimile device, generating image information by reading an image from an original document using a scanner, and transmitting the image information with the selective one of the sender information and the device identification information to the destination.

Still further, there is provided a method of controlling a facsimile device. The method includes the steps of specifying a remote destination using an operation panel provided to the facsimile device, specifying a user of a computer connected to the facsimile device using the operation panel, generating user information identifying the specified user, generating image information by reading an image from an original document using a scanner, and transmitting the image information with the user information to the specified remote destination.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

Internet facsimile machine and a facsimile system according to a preferred embodiment of the present invention will be described while referring to the accompanying drawings. In the following description, the expressions "front", "rear", "left", "right", and "upper", "lower" are used throughout the description to define the various parts when the printer is disposed in an orientation in which it is intended to be used.

It should be noted that in the present embodiment, the facsimile machine is of a multifunction variety, and has a facsimile function, a printer function, a copy function, an image scanner function, a personal-computer facsimile function, an answering machine memory function, and other functions. Also, the facsimile system includes a single facsimile machine and a plurality of personal computers connected to each other by an in-house local area network (LAN). The facsimile system to connected to a remote facsimile machine by way of the Internet and a public transmission exchange network.

First, a network of the facsimile system, will be described while referring to FIG. 1.

Figure 1:
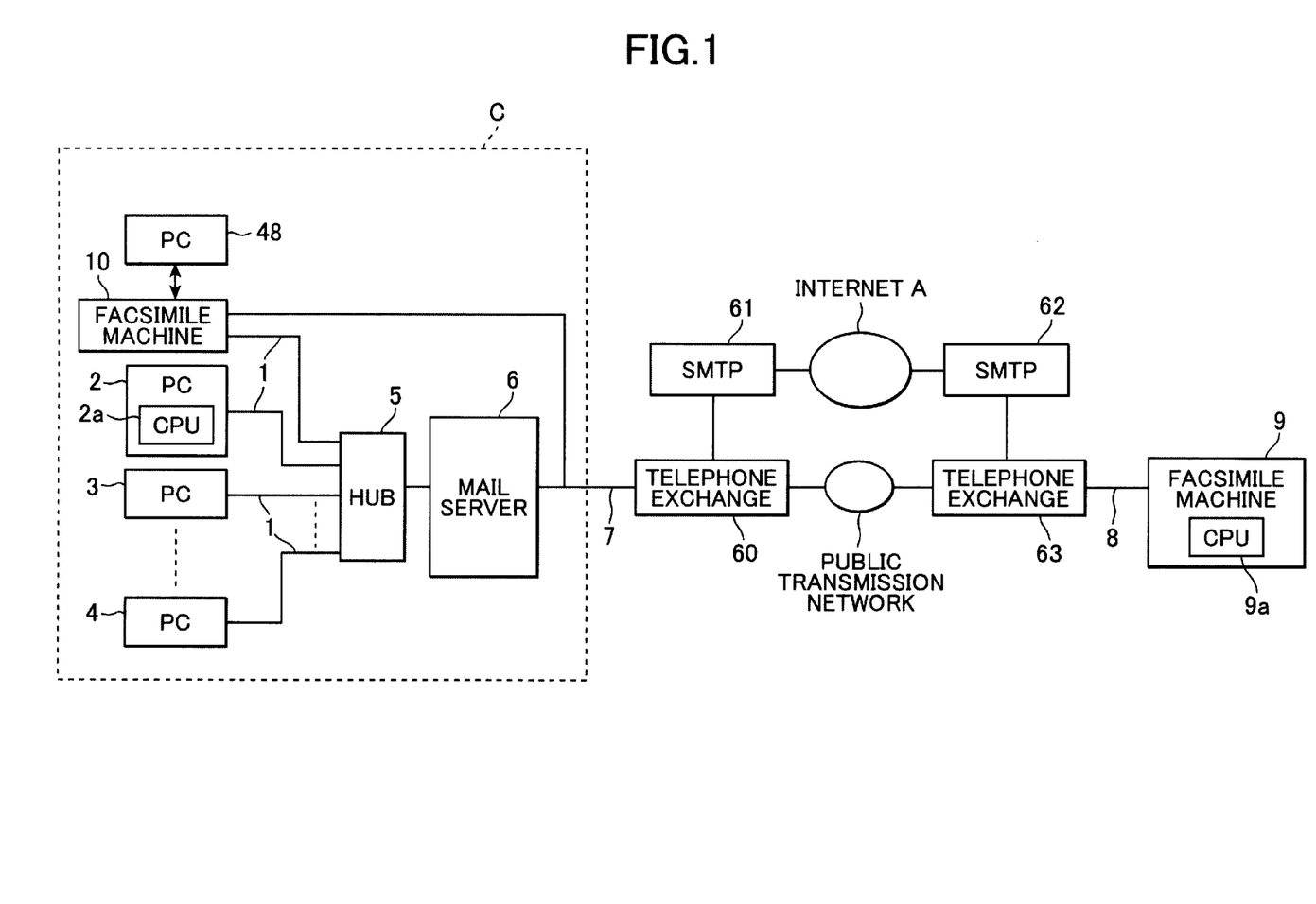
FIG. 1 is a block diagram showing a network of a facsimile system according to an embodiment of the present invention.

As, shown in FIG. 1, a local facsimile machine 10 is connected to a remote facsimile machine 9 both via the Internet A and a public transmission exchange network B. More specifically, the facsimile system includes devices in a company C, simple mail transfer protocol (SMTP) servers 61, 62, telephone exchanges 60, 63, the remote facsimile machine 9, the Internet A, the public transmission exchange network B, and telephone circuits 7, 8. The company C has the local facsimile machine 10, a plurality of personal computers 2, 3, 4, 48, a hub 5, and a mail server 6. The personal computer 48 in directly connected to the local facsimile machine 10. The facsimile machine 10 and the personal computers 2, 3, 4 are connected to the hub 5 by way of a LAN cable 1. The hub 5 is connected to the mail server 6. The server 6 is connected to the telephone exchange 60 by way of the telephone circuit 7, and performs distribution of e-mail messages.

The telephone exchange 60 is connected to the SMTP server 61 with which the company C has a contract for connection. The SMTP server 61 is connected to the SMTP server 62 via the Internet A. A user of the remote facsimile machine 9 has a contract for connection with the SMTP server 62. The SMTP server 62 is connected to the telephone exchange 63. The telephone exchange 63 is connected to the remote facsimile machine 9 via the telephone circuit 8. The telephone exchange 60 and the telephone exchange 63 are connected to each other through the public transmission exchange network B so that the local facsimile machine 10 and the remote facsimile machine 9 are capable of performing normal facsimile transmissions.

It should be noted that the facsimile machine 10, the remote facsimile machine 9, and the personal computers 2, 3, 4 include a transmission function for transmitting image data over the Internet A appended to an e-mail message and a reproduction function for reproducing a received e-mail message appended with image data.

Figure 2:
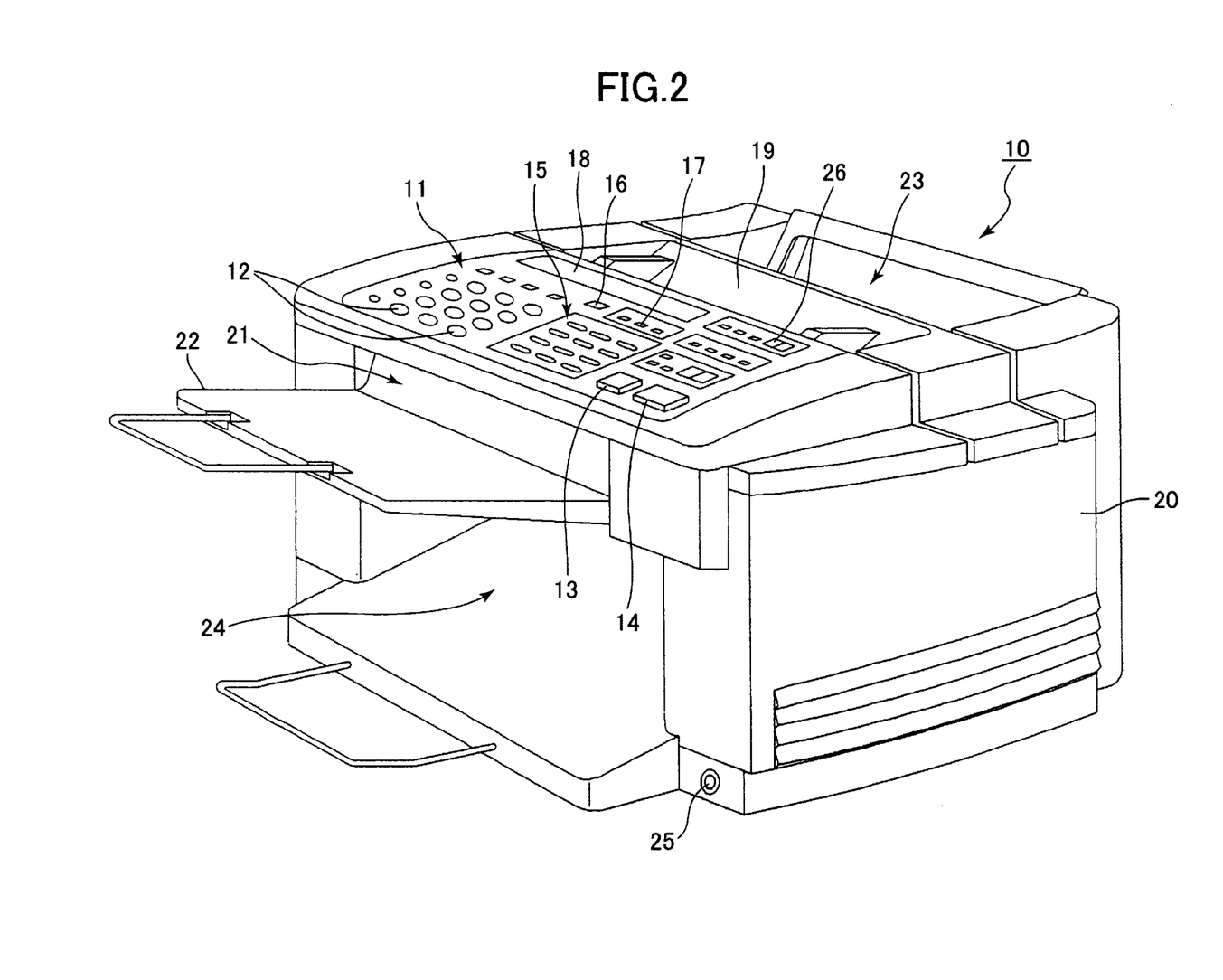
FIG. 2 is a perspective view showing a local facsimile device according to the embodiments of the present invention.

Next, an external configuration of the facsimile machine 10 will be described while referring to FIG. 2. The facsimile machine 10 includes a box-shaped housing 20. An operation panel 11 is provided at the upper front surface of the housing 20. The operation panel 11 includes 0 to 9 numeric keys 12, a stop button 13, a start button 14, speed dial buttons 15, a transmission switching button 16, registration buttons 17, a switching button 26, and a liquid crystal display (LCD) 18. The numeric keys 12 are for inputting remote destination data, device identification data, and user specific data. The remote destination data includes, a user name, facsimile number, and mail address of the remote facsimile macho 9. The device identification data includes user name, company name, facsimile number, an mail address of the local facsimile machine 10. The user specific data includes user name, company name, facsimile number, and mail address separately for each user of respective one of the personal computers 2, 3, 4.

The start button 14 is for commanding start of, for example, image retrieval from an original document. The stop button 13 is for indicating, for example, termination of transmission of image data. The speed dial buttons 15 are for retrieving remote device data or user specific data. The transmission switching button 16 is for switching between a normal facsimile transmission and an Internet facsimile transmission. The registration buttons 17 are for determining registration of device identification data, remote destination data, and user specific data inputted by the numeric keys 12. The switching button 26 is for switching mode of the local facsimile machine 10, such as a device identification data registration mode, a remote destination data registration mode, and a specific local user registration mode. It should be noted that the numeric keys 12 can be used to input characters and symbols as well as numbers.

The liquid crystal display 18 is provided to the rear portion of the operation panel 11. The liquid crystal display 18 is for displaying device identification data, remote device data, user specific data, and also a transmission condition, transmission results, reception results, an operation condition, and functions of the local facsimile machine 10.

Figure 3:
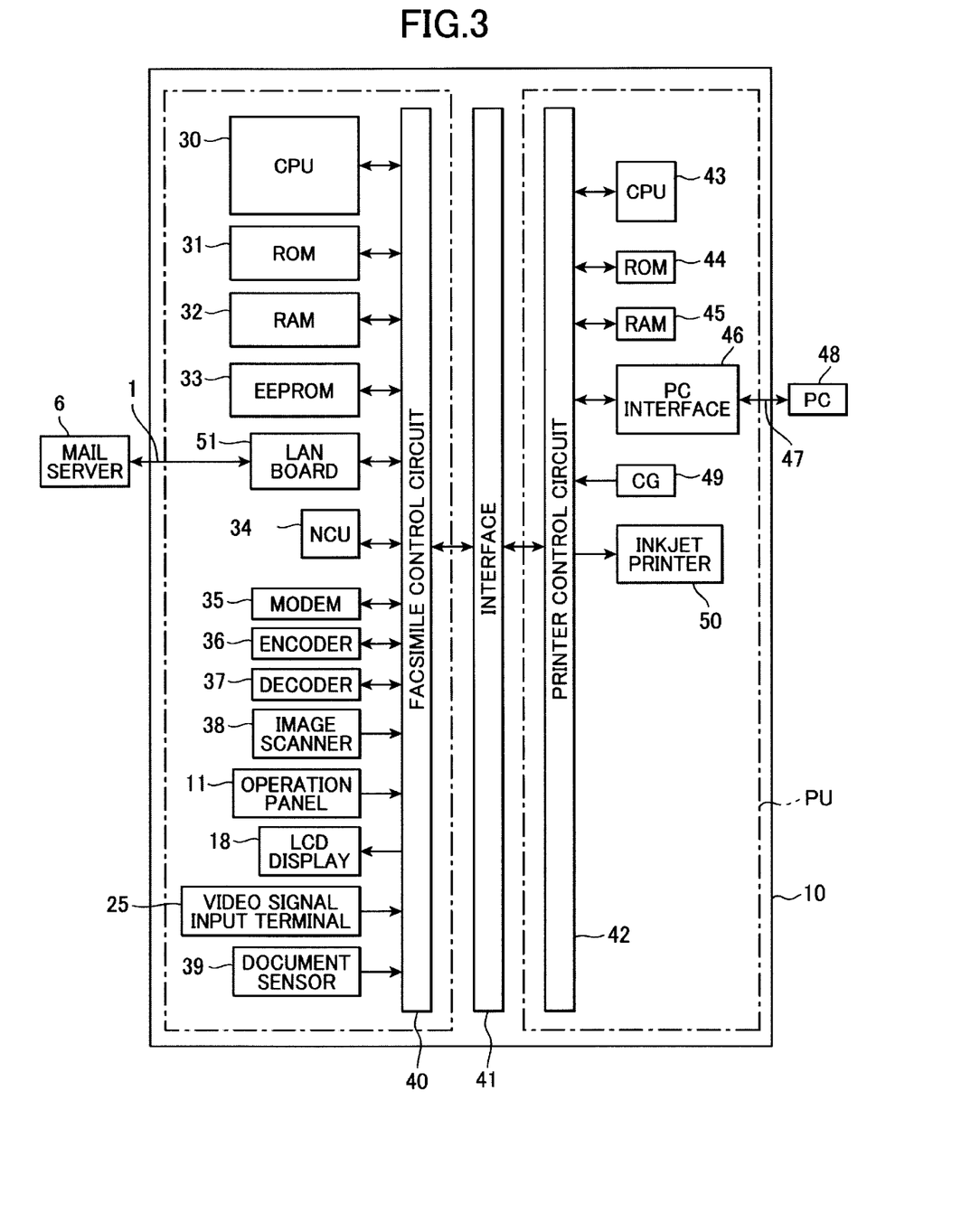
FIG. 3 is a block diagram showing an electrical configuration of the facsimile machine shown in FIG. 2.

The housing 20 is formed with a document set portion 19, a document discharge port 21, a recording sheet set portion 23, and a recording sheet discharge portion 24, and further includes a tray 22. The document set portion 19 is provided behind the operation panel 11 for setting an original document. An original document set in the document set portion 19 is transported into the housing 20 by a sheet feed mechanism (not shown) provided in the housing 20. An image on the original document is retrieved by an image scanner 38 (FIG. 3). Original documents are discharged one at a time through the document discharge port 21 onto the tray 22 to form a stack on the tray 22. The recording sheet set portion 23 is formed behind the document set portion 19. The recording sheet set portion 23 is for freely detachably setting a sheet cassette (not shown). The sheet cassette houses a plurality of recording sheets in a stacked condition. The recording sheets are transported one at a time into the housing 20 by the sheet feed mechanism. After formed with an image by an ink jet printer 50 (FIG. 3) based on image data, the recording sheets are discharged through the recording sheet discharge portion 24.

A video signal input terminal 25 is provided at the lower right end corner of the front surface of the housing 20. The video signal input to 25 is connected to a video camera, for example, for receiving video signals therefrom.

Although not shown in the drawings, terminals and the like are provided on the rear surface of the housing 20 for connecting with the LAN cable 1, the public transmission exchange network B, and the connection cable 47, which is connected to the personal computer 48. Also, a handset (not shown) for performing transmission and reception of telephone calls is provided on the left side surface of the housing 20.

Next, electrical configuration of the local facsimile machine 10 will be described while referring to FIG. 3. As shown in FIG. 3, the local facsimile machine 10 includes a facsimile unit FU, a print unit PU, and an interface 41 connected to the facsimile unit FU and the print unit PU. The facsimile unit FU includes a facsimile control circuit 40. The facsimile unit FU further includes a central processing unit (CPU) 30, a read only memory (ROM) 31, a random access memory (RAM) 32, an electrically erasable and programmable read only memory (EEPROM) 33, a LAN board 51, a network control unit (NCU) 34, a modem 35, an encoder 36, a decoder 37, an image scanner 38, the operation panel 11, the liquid crystal display 18, the video signal input terminal 25, and a document sensor 39, all connected to the facsimile control circuit 40.

The CPU 30 is for executing registration of device identification data, remote destination data, and user specific data, and also executing a variety of different controls. For example, the CPU 30 executes routines for operating the image scanner 38, routines for transmitting and receiving image data and e-mail messages, and routines for inputting and outputting a variety of data.

Figure 4A:
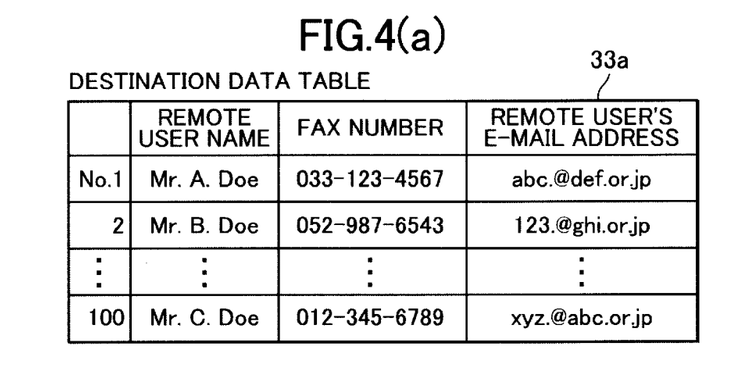
FIG. 4(a) is a schematic view of a remote user specific data table stored in an EEPROM of the facsimile device shown in FIG. 2.
Figure 4B:
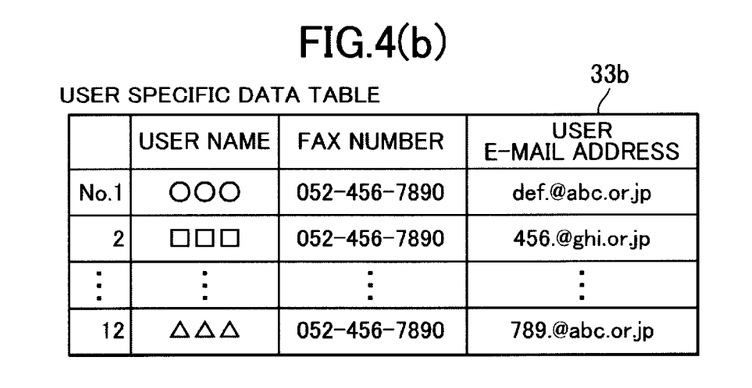
FIG. 4(b) is an explanatory view showing a local user specific data table stored in the EEPROM.
Figure 4C:
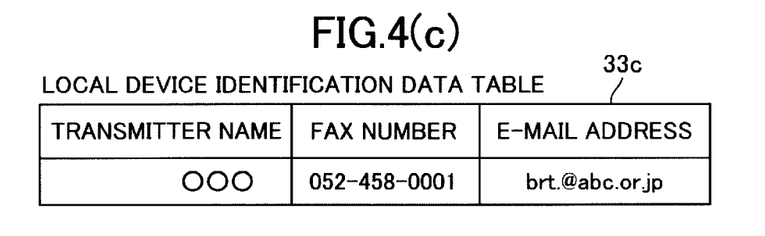
FIG. 4(c) is a schematic view showing a device identification data table stored in the EEPROM.

As shown in FIGS. 4(a) to 4(c), the EEPROM 33 stores a remote destination data table 33a, a user specific data table 33b, and a local device identification data table 33c. The remote destination data table 33a stores remote destination data, that is, user name, facsimile numbers, and e-mail addresses, of 100 remote users in correspondence with 100 destination numbers 1 to 100. The user specific data table 33b stores user specific data, that is, user names, facsimile numbers, and e-mail addresses, of 12 local users in correspondence with user numbers 1 to 12. The local device identification data table 33c stores device identification data, that is, a location name, for example, a department name, a facsimile number, and an e-mail address, of the local facsimile machine 10.

Figure 4D:
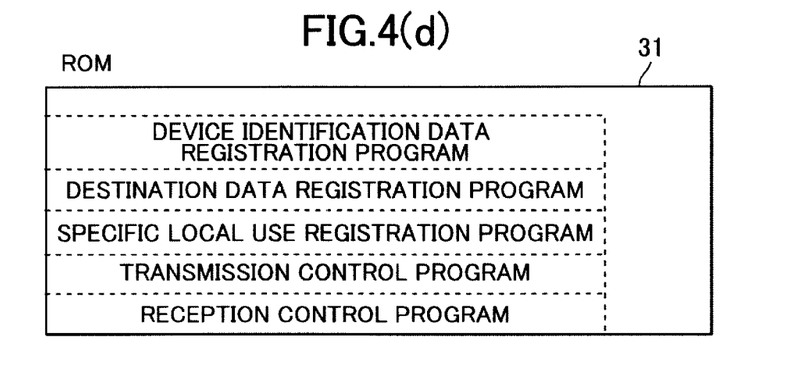
FIG. 4(d) is a schematic view showing types of computer programs stored in a ROM of the facsimile machine shown in FIG. 2.

An shown in FIG. 4(d), the ROM 31 stores a variety of programs which are executed by the CPU 30. The programs include a device identification data registration program 31a, a remote destination data registration program 31b, a specific local user registration program 31c, a transmission control program 31d, and a reception control program 31e. The device identification data registration program 31a is for registering device identification data in the device identification data table 33c. The remote destination data registration program 31b is for registering remote destination data in the remote destination data table 33a. The specific local user registration program 31c is for registering user specific data in the user specific data table 33b. The transmission control program 31d is for transmitting image data, e-mail messages, or e-mail messages appended with image data. The reception control program 31e is for receiving image data, e-mail, messages, or e-mail messages appended with image data.

The RAM 32 is for temporarily storing the variety of programs retrieved from the ROM 31, image data retrieved by the image scanner 38, and e-mail messages received from remote devices.

Each of the speed dial buttons 15 corresponds to one of the user numbers 1 to 12 in the user specific data table 33b and also to one of the destination numbers 1 to 12 in the remote destination data table 33a. Other registration numbers can be retrieved by inputting the registration numbers directly using the numeric keys 12.

The encoder 36 is for encoding image data retrieved by the image scanner 38 into compressed data. The decoder 37 is for decoding encoded image data received from the remote facsimile machine 9.

The print unit PU includes a printer control circuit 42. The print unit PU further includes a CPU 43, a ROM 44, a RAM 45, a PC interface 46, a character generator (CG) 49, and the ink jet printer 50, all connected to the printer control circuit 42. The printer control circuit 42 is for controlling the ink jet printer 50. The ROM 44 stores programs which are executed by the CPU 43 for controlling the ink jet printer 50. The RAM 45 has a print memory for storing print data and a work memory which is used while the CPU 43 is executing program. The PC interface 46 is connected to the personal computer 48. The character generator 49 is for storing vector fonts of characters to be printed.

Figure 5:
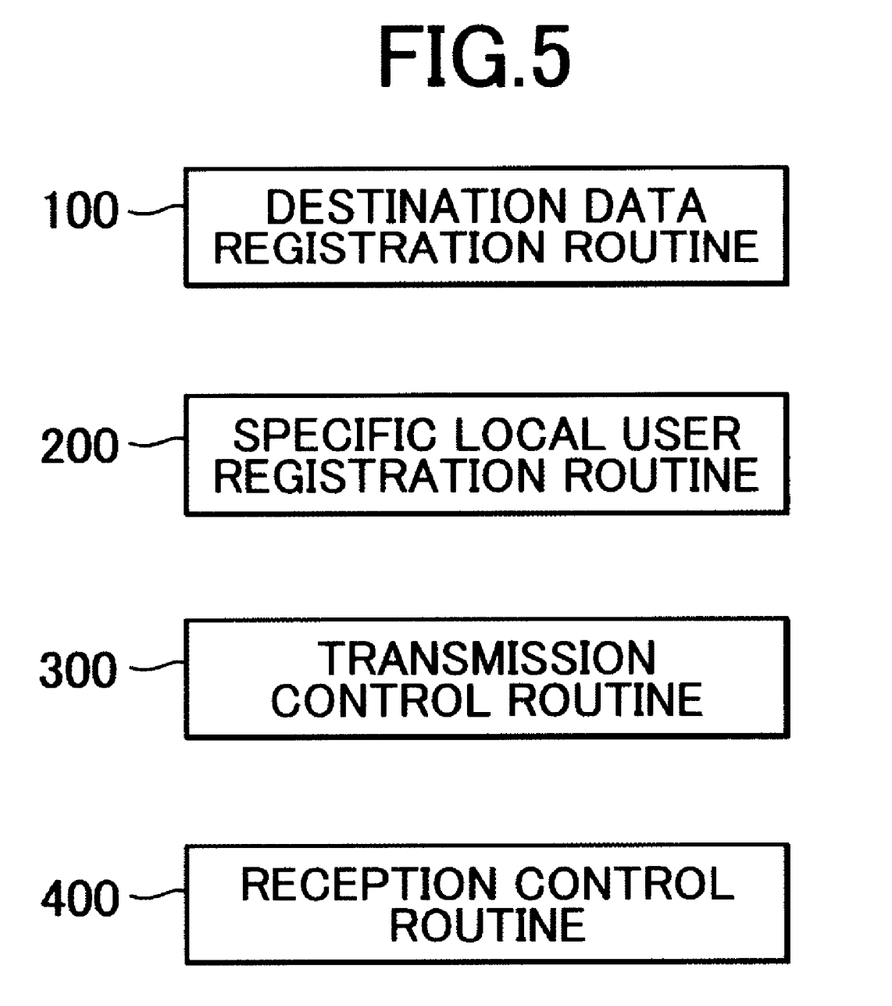
FIG. 5 shows essential processes performed by the CPU of the facsimile machine shown in FIG. 2.

Next, main processes executed by the CPU 30 of the local facsimile machine 10 will be described while referring to FIG. 5. As shown in FIG. 5, the CPU 30 executes a remote destination data registration routine 100, a specific local user registration routine 200, a transmission control routine 300, and a reception control routine 400. The remote destination, data registration routine is for registering remote destination data inputted by a user operating the numeric keys 12 into the remote destination data table 33a of the EEPROM 33. The specific local user registration routine 200 is for registering user specific data in the user specific data table 33b. The transmission control routine 300 is for controlling transmission of image data retrieved by the image scanner 38, e-mail messages, or e-mail messages appended with the image data. The reception control routine 400 is for receiving image data, e-mail messages, or e-mail messages appended with image data.

Figure 6:
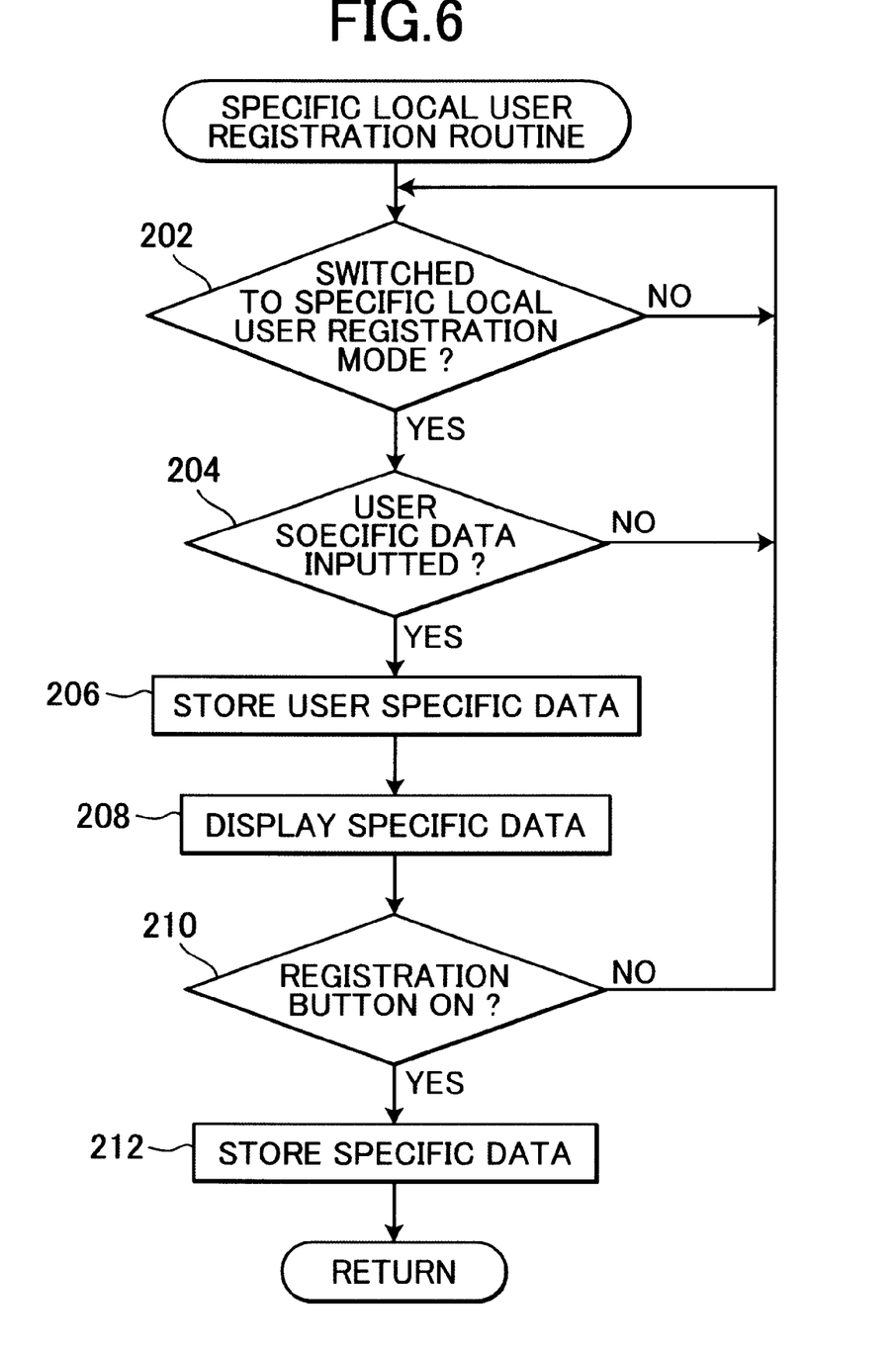
FIG. 6 is a local user registration routine performed in S200 of the flowchart in FIG. 5.

Next, the specific local user registration routine 200 will be described while referring to the flowchart shown in FIG. 6. It should be noted that in this example, it is assumed that the user of the personal computer 2 transmits a message to the remote facsimile machine 9 by using the local facsimile machine 10. Also, in this explanation, the user of the local facsimile machine 10 will be referred to as the local user.

First in S202, it is determined whether or not the specific local user registration mode has been selected by the local user manipulating the switching button 26. If so (YES:S202), then in S204, it is determined whether or not user specific data has been inputted. This determination can be made by detecting whether or not the local user has manipulated the numeric keys 12. If so (YES:S204), then in S206, the inputted user specific data is temporarily stored in the RAM 32. Next in S208, the liquid crystal display 18 displays the inputted user specific data. The local user examines the user specific data on the liquid crystal display 18, and confirms whether or not the inputted user specific data is correct.

Next, it is determined in S210 whether or, not the registration button 17 has been pressed. If so (YES:S210), then in S212, the user specific data is retrieved from the RAM 32 and stored in the user specific data table 33b of the EEPROM 33, and this routine returns. On the other hand, if not (NO:S210), processes of S202 to S208 are repeated until S210 results in an affirmative determination. In this way, the local user can register his or her owe name, the facsimile number, and e-mall address.

Figure 7:
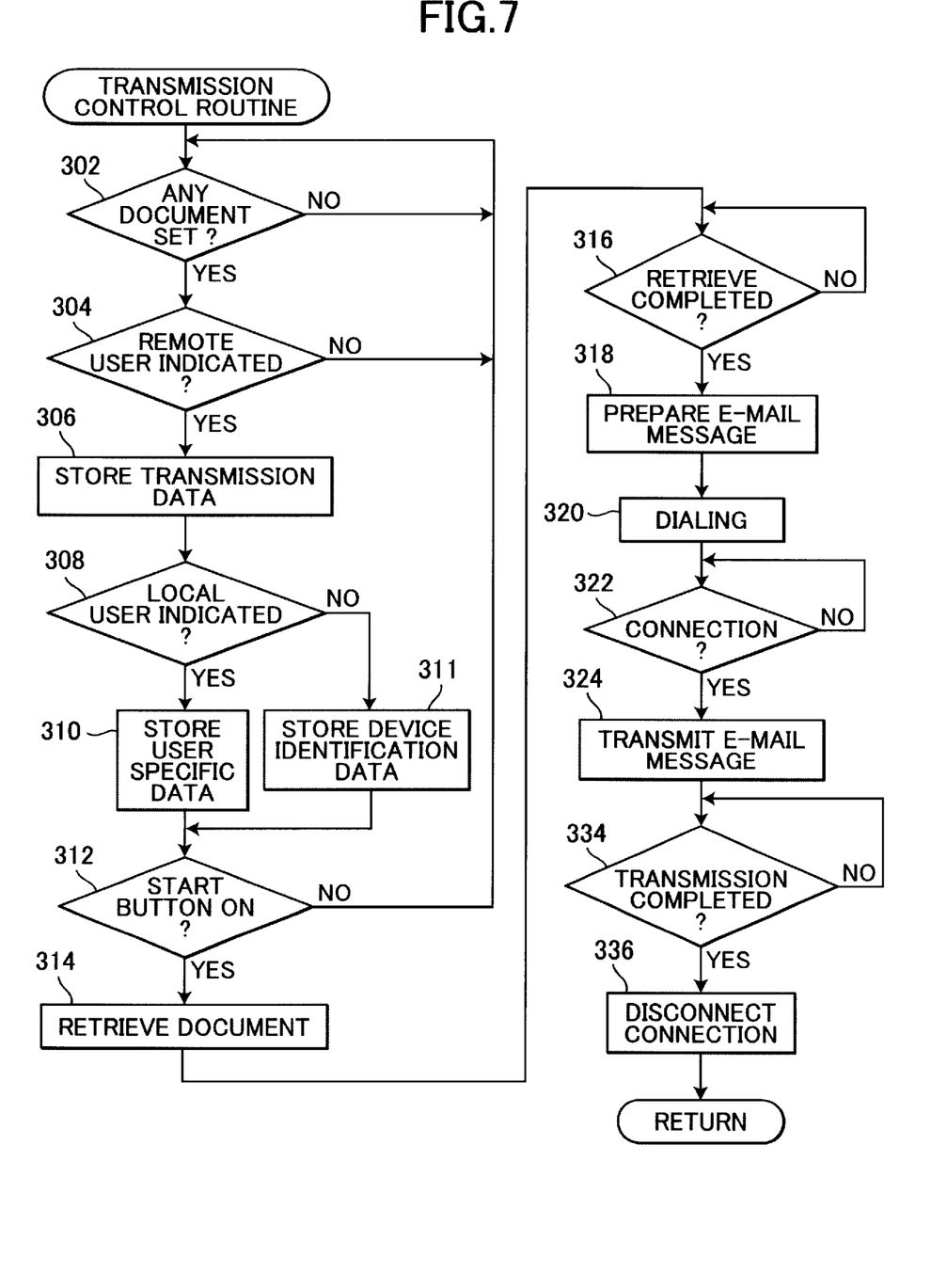
FIG. 7 is a flowchart representing a transmission control routine executed in S300 of the flowchart in FIG. 5.

Next, the transmission control routine 300 will be described while referring to the flowchart shown in FIG. 7. In the transmission control routine 300, image data is sent to the remote facsimile machine 9 along with selective device identification data and the user specific data.

First in S302, it is determined whether or not an original document has been set to the local facsimile machine 10. This determination can be made by detecting a detection signal from the document sensor 39. If so (YES:S302), it is determined in S304 whether or not a destination has been specified by the local user. The local user can specify a desired destination by either selecting one of the speed dial buttons 15 or manipulating the numeric keys 12. If S304 results in an affirmative determination (YES:S304), then in S306, remote destination data of the specified destination is temporarily stored in the RAM 32.

Next in S308, it is determined whether or not user specific data is specified by the local user. In order to specify the user specific data, the local user manipulates the switching button 26 and either the speed dial buttons 15 or the numeric keys 12. If S308 results in an affirmative determination (YES:S308), then in S310, the indicated user specific data is temporarily stored in the RAM 32, and the program proceeds to S312. On the other hand, if S308 results, in a negative determination, then in S311, the device identification date is temporarily stored in the RAM 32. Then, the program proceeds to S310. In S312, it is determined whether or not the start button 14 has been depressed. If so (YES:S312), then in S314, the internal image scanner 38 executes a retrieving operation for retrieving image data from the original document, and the program proceeds to S316. In S316, it is determined whether or not the retrieving operation has been completed. If so (YES:S316), then in S318, an e-mail message is prepared. At this time, the image data retrieved in S314 is converted into a file format, that is, a tag image file format (TIFF) in the present embodiment. Also, the remote destination date stored in S306 is registered in a predetermined destination area of the e-mail message. Further, either the user specific data or the device identification data which was stored in the RAM 32 in S310 or 311, respectively is stored in a predetermined data-source area of the e-mail message.

Next in S320, the CPU 30 dials the SMTP server 61, and it to determined in S322 whether or not a connection has been made with the SMTP server 61. If so (YES:S322), then in S324, the e-mail message is transmitted. It is determined in S334 whether or not the transmission of the e-mail message has been completed. If so (YES:S334), the connection with the SMTP server 61 is disconnected in S336, and the present routine returns.

It should be noted that the e-mail message transmitted to the SMTP server 61 is then transmitted over the Internet A to the SMTP server 62, where it is stored. When the remote facsimile machine 9 accesses the SMTP server 62 over the telephone exchange 63, the e-mail message is transmitted from the SMTP server 62 to the remote facsimile machine 9. When the remote facsimile machine 9 executes printing processes, the user specific data is printed on a recording sheet with the image data (if YES:S308). In this way, a remote user of the remote facsimile machine 9 can know the local user that sent the e-mail message. Alternatively, when the remote facsimile machine 9 displays the received message, the user specific data is displayed on a display unit with the image data. In this case also, the remote user can know who the e-mail message is from, Therefore, the remote user can prepare and transmit a reply e-mail message to the local user of the personal computer 2. Accordingly, the local user can immediately receive the reply e-mail message and know the content thereof by using his or her own personal computer 2. There is no need for the local user to walk over to the local facsimile machine 10 to retrieve the response e-mail message.

Figure 8:
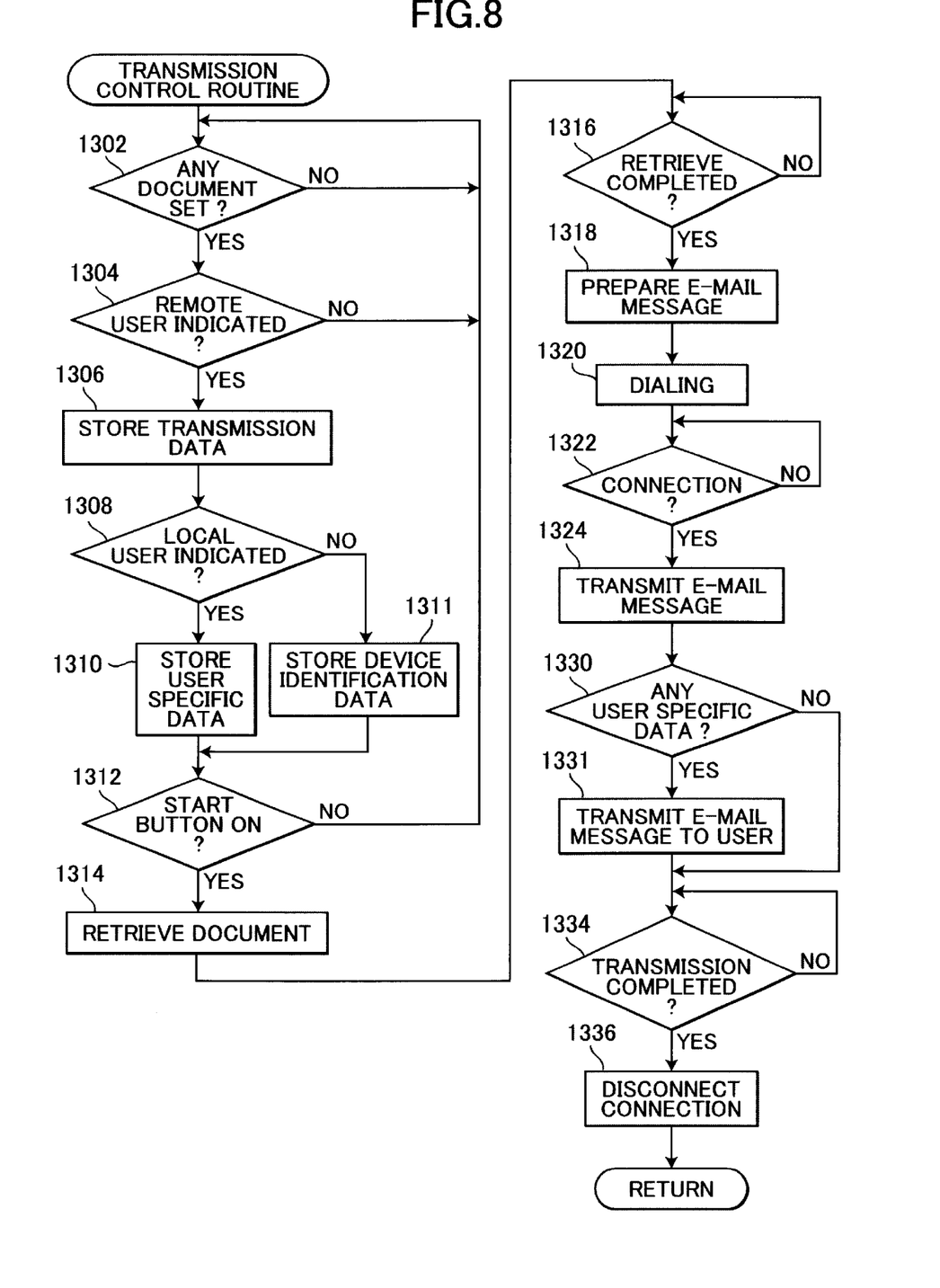
FIG. 8 is a flowchart representing a transmission control routine executed by a CPU in a facsimile device according to a second embodiment of the present invention.

Next, a transmission control routine 1300 according to a second embodiment of the present invention will be described while referring to the flowchart shown in FIG. 8. According to the transmission control routine 1300, an e-mail message is transmitted to an indicated destination and also to the local user of the facsimile machine 10. It should be noted that S1302 to S1324 of the transmission control routine 1300 are the same as S302 to S324 of the above-described transmission control routine 300. So explanation for the S1302 to S1324 will be omitted.

After an e-mail message in transmitted in S1324, it is determined in S1330 whether or not any user specific data is stored in the RAM 32. If so (YES:S1330), then in S1331, the same e-mail message is transmitted to the user indicated by the user specific data. Next in S1334, it is determined whether or not the e-mail message has been transmitted completely. If so (YES:S1334), the connection with the SMTP server 61 is disconnected in S1336, and the present routine returns. On the other hand, if S1330 results in a negative determination (NO:S1330), the program directly proceeds to S1334.

As described above, according to the present embodiment, the e-mail message transmitted to the remote facsimile machine 9 is also transmitted to the personal computer 2. Therefore, the local user of the personal computer 2 can confirm the content of the e-mail message just he or she transmitted. Also, even if the transmission of the e-mail message to the remote facsimile machine 9 in failed, the local user can re-transmit the e-mail message directly from the personal computer 2.

Figure 9:
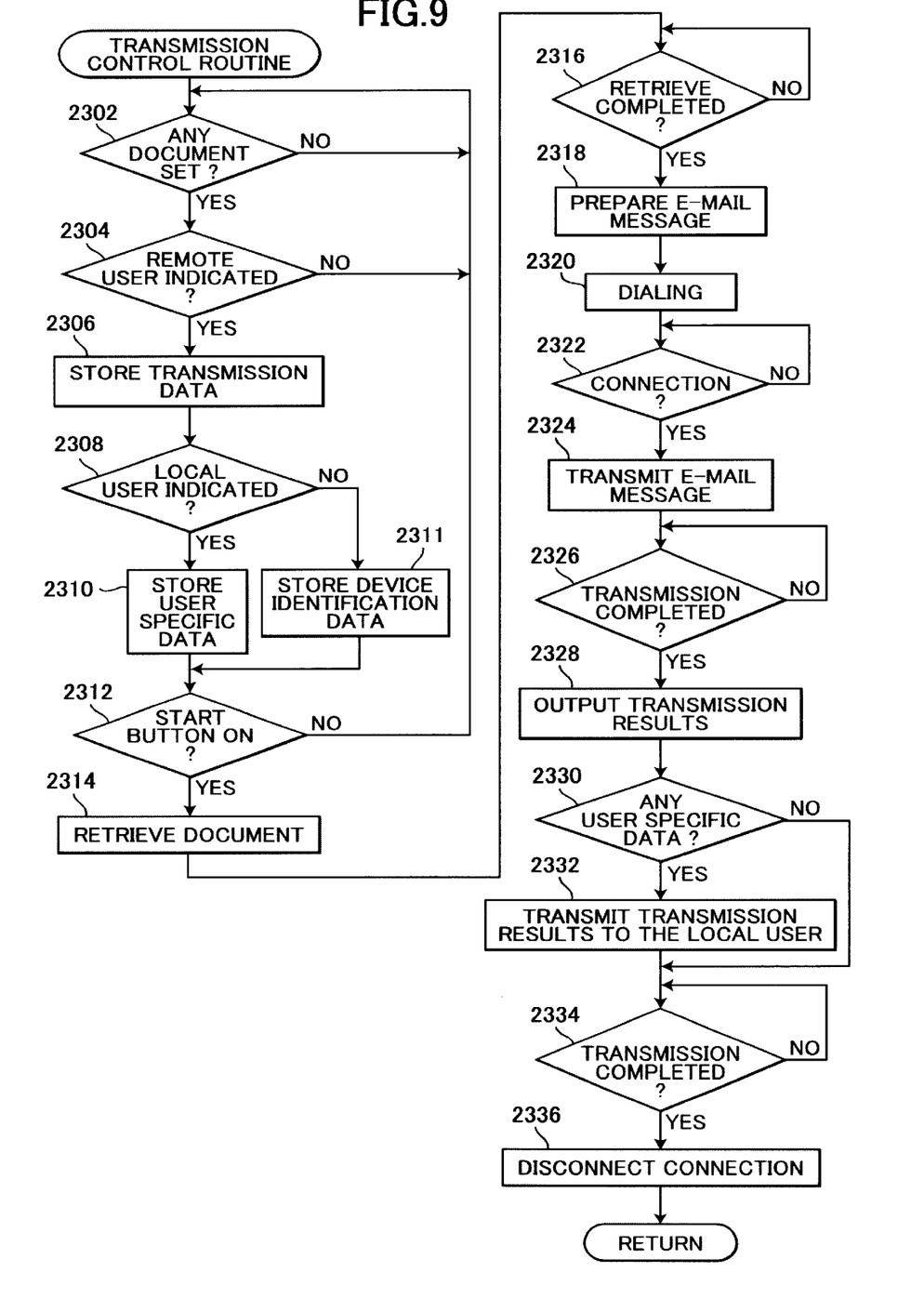
FIG. 9 is a flowchart representing a transmission control routine executed by a CPU provided in a facsimile machine according to a third embodiment of the present invention.

Next, a transmission control routine 2300 according to a third embodiment of the present invention will be described while referring to the flowchart shown in FIG. 9. Because S2302 to S2324 of the transmission control routine 2300 are the same as S302 to S324 of the above-described transmission control routine 300, explanation of S2302 to S2324 will be emitted.

After it is determined in S2326 that an e-mail message has been completely transmitted to a specified destination (YES:S2326), transmission results is detected and outputted in S2328. That is, the transmission results data are displayed on the liquid crystal display 18 and also temporarily stored in the RAM 32. Next in S2330, it is determined whether or not any user specific data is stored in the RAM 32. If so (YES:S2330), than in S2332, the transmission results data are retrieved from the RAM 32 and transmitted to the user specified by the user specific data, that is, the personal computer 2 in this example. If it is detected in S2334 that the transmission of the transmission results data has been completed (YES:S2334), the connection with the SMTP server 61 is disconnected in S2336, and the present routine returns. On the other hand, if S2330 results in a negative determination, the process proceeds directly to S2334.

As described above, according to the present embodiment, the local user can receive the transmission result data using his or her own personal computer 2, and the transmission results data can be displayed or printed out. Accordingly, the local user can immediately know, by using his or her own personal computer 2, whether or not the e-mail message was properly transmitted from the local facsimile machine 10. When the transmission results indicate that the transmission was not properly performed, the local user can immediately re-transmit the e-mail message.

Figure 10:
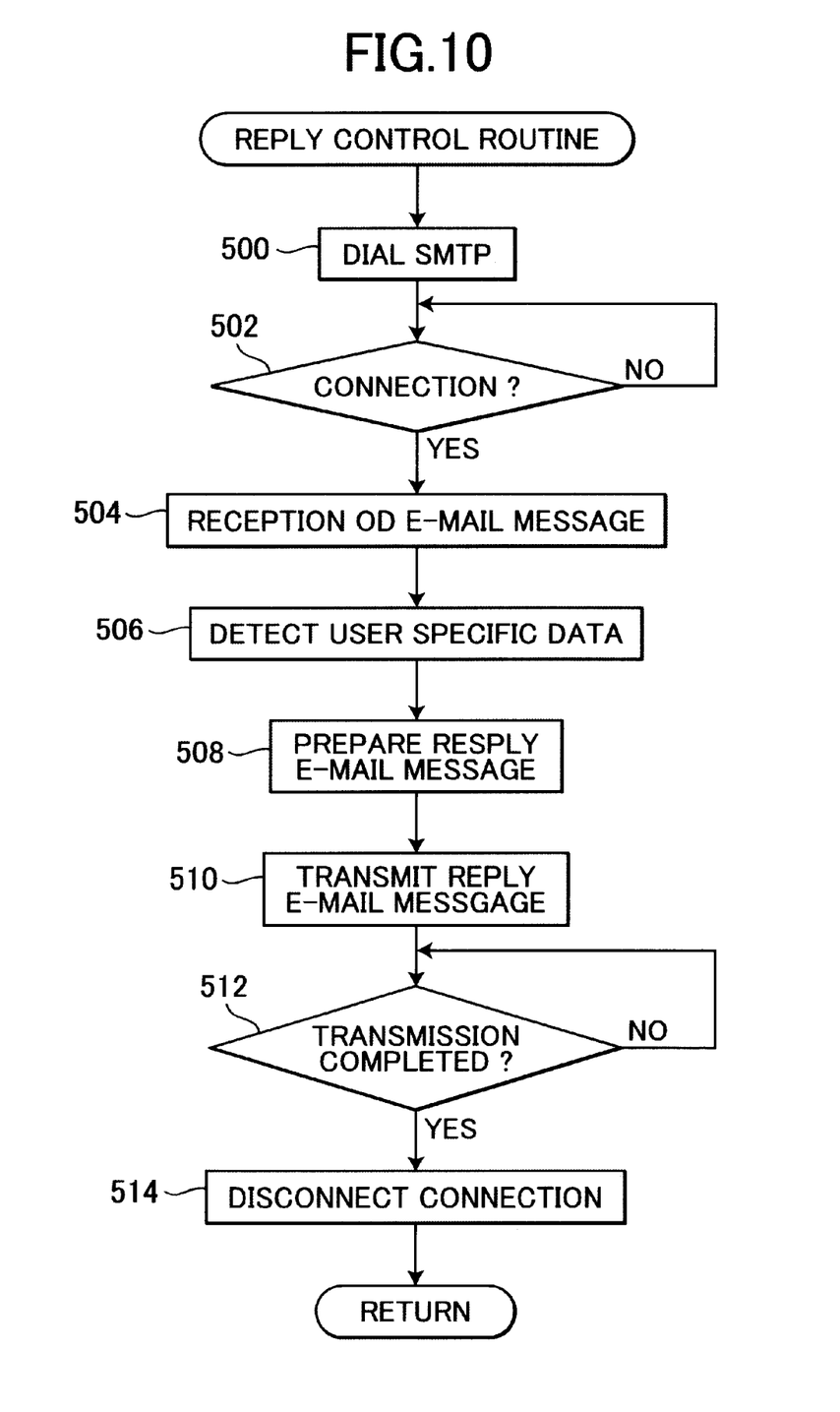
FIG. 10 is a flowchart representing a reply control routine executed by a CPU provided in a remote facsimile machine according to the present invention.
Figure 11:
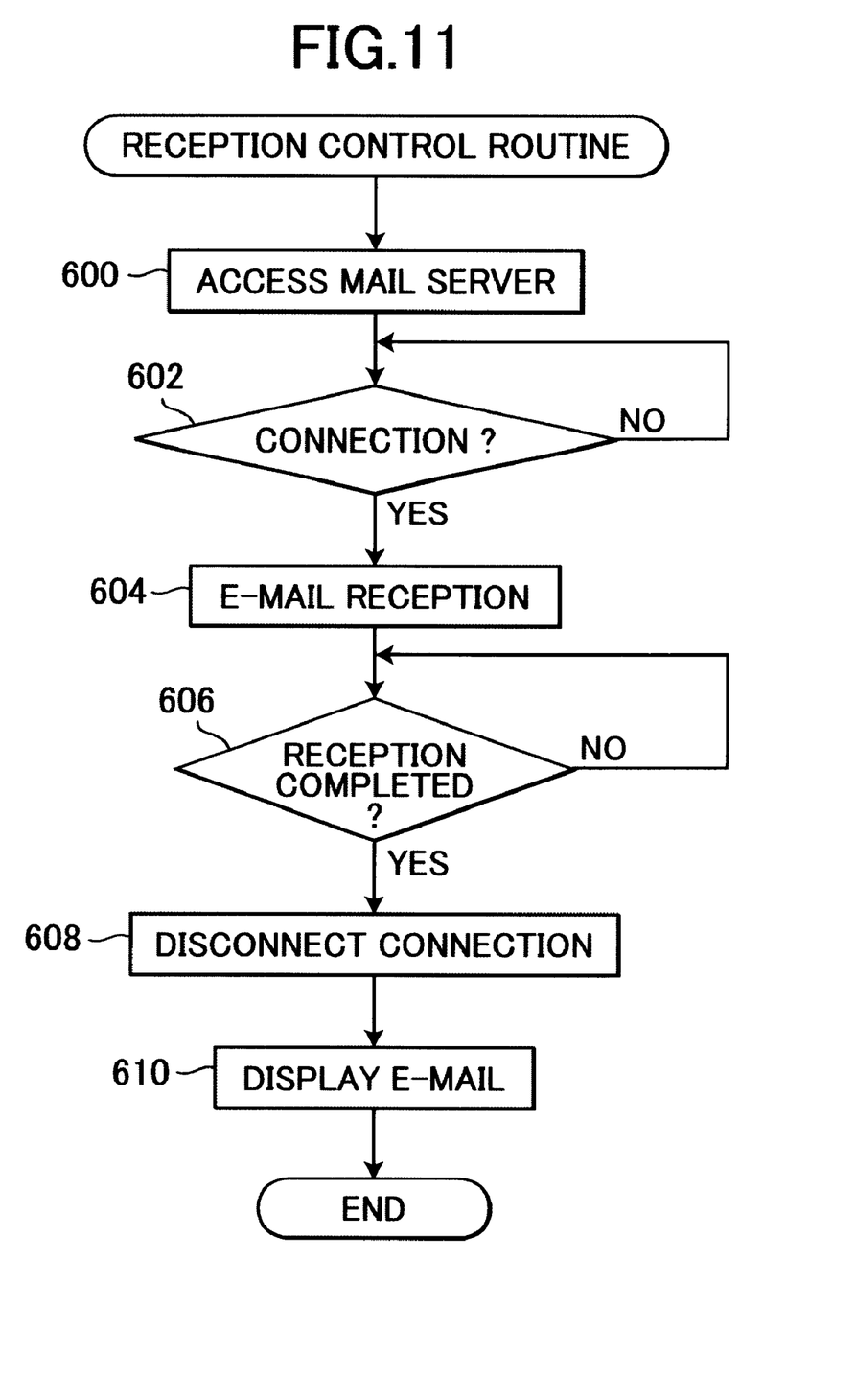
FIG. 11 is a flowchart representing a reception control routine executed by a CPU in a local personal computer.

Next, the reply control routine and the reception control routine will be described while referring to the flowcharts shown in FIGS. 10 and 11. The reply control routine is executed by the CPU 9a of the remote facsimile machine 9. The reception control routine is executed by the CPU 2a of the personal computer 2.

First, the reply control routine will be described. It should be noted that in the present embodiment, it is assumed that an e-mail message transmitted from the personal computer 2 is stored in the SMTP 62.

When the reply control routine is started, the CPU 9a dials up the SMTP server 62 in S500. Next in S502, it is determined whether or not a connection with the SMTP server 62 has been made. If so (YES:S502), then in S504, the e-mail message is received from the SMTP server 62. Next, in S506, the CPU 9a automatically detects user specific data from the received e-mail message using the e-mail transmission program. Then in S508, the CPU 9a prepares a reply e-mail message, wherein the user specific data detected in S506 is registered as remote destination data in a predetermined destination area of the reply e-mail message. It should be noted that in the present example, a predetermined message has been preregistered in a predetermined message area of the reply e-mail message. For example, the predetermined message can be "I received your message safely". Then in S510, the reply e-mail message in transmitted, and then, it is determined in S512 whether or not the transmission of the reply e-mail messages is completed. If so (YES:S512), then in S514, the connection with the SMTP server 62 is disconnected, and the present process returns.

The reply e-mall message which the SMTP server 62 received from the remote facsimile machine 9 is transmitted over the Internet A to the SMTP server 61 and further to the mail server 6, and stored in the mail server 6.

Next, the reception control routine executed by the CPU 2a of the personal computer 2 will be described while referring to the flowchart shown in FIG. 11.

First in S600, the CPU 2a accesses the mail server 6. Next, it is determined in S602 whether or not a connection with the mail server 6 has been made. If so (YES:S602), then in S604, the reply e-mail message is received from the mail server 6. Next in S606, it is determined whether or not reception of the reply e-mall message is completed. If so (YES:S604), then in S608, the connection is disconnected, and the program proceeds to S610. In S610, the reply e-mail message just received is displayed on a display provided to the personal computer 2. Then, the present routine returns.

As described above, according to the present embodiment, when the remote facsimile machine 9 receives an e-mail message, a reply e-mail message is automatically prepared and transmitted to the mail server 6. Therefore, a local user of the personal computer 2 can be immediately confirm safe receipt of the e-mail message without the remote user having to manually prepare and transmit a reply e-mail message or to make a telephone call. It should be noted that the reception control routine can be started either when requested by the local user or periodically.

While the invention has been described in detail with reference to specific embodiments thereof, it would be apparent to those skilled in the art that various changes and modifications may be made therein without departing from the spirit of the invention, the scope of which is defined by the attached claims.

For example, the above-described programs executed by the CPU 30 can be executed by a CPU provided internally in the personal computer 48.

Also, an image scanner and a personal computer can be connected, and a CPU provided to the personal computer can execute the above-described transmission control programs.

In this case, a computer program for executing these processes is installed in the personal computer using a drive from a recording medium, such as a CD ROM, a floppy disk, and like.

What is claimed is:

1. A facsimile device communicable with remote devices, comprising:
   a scanner that reads image information from an original document;
   a destination specifying unit that specifies one of the remote devices as a destination;
   a user specifying unit that specifies a user, the user being a sender of the image information;
   a user information generating unit that generates user information identifying a user when the user specifying unit specifies the user, the user information being unrelated to an identification of the facsimile device; and
   a transmission unit that transmits the image information with the user information to both the destination specified by the destination specifying unit and the user identified by the user information, wherein the user information includes at least an electronic mail address of the user.

2. The facsimile device according to claim 1, further comprising a memory that stores device information identifying the facsimile device, wherein only when a user is not specified, the transmission unit transmits the image information with the device information to the destination specified by the destination specifying unit.

3. The facsimile device according to claim 1, wherein the user information further includes at least one of a user name, a company name, and a telephone number of the user.

4. The facsimile device according to claim 1, wherein the transmission unit comprises a detection unit that detects transmission results after the image information with the user information is transmitted and a result information generating unit that generates result information based on the transmission results detected by the detection unit, wherein the transmission unit transmits the result information to the user identified by the user information.

5. The facsimile device according to claim 1, wherein the user specifying unit comprises an operation panel, wherein a user is specified by a user manipulating the operation panel, and the user information generating unit comprises an another memory that stores user information about a plurality of users and a retrieve unit that retrieves user information about the user specified by the user specifying unit.

6. The facsimile device according to claim 1, wherein the transmission unit transmits the image information with the user information as an e-mail message.

7. A communication system comprising:
at least one computer;
a facsimile device operatively connected to the at least one computer; and
at least one terminal device communicable with the facsimile device, wherein the facsimile device comprises:
an image information generating unit that generates image information;
a terminal device specifying unit that specifies one of the at least one terminal device;
a sender specifying unit that specifies one of the at least one computer;
a sender information generating unit that generates sender information identifying the computer specified by the sender specifying unit; and
a transmission unit that transmits the image information with the sender information to the terminal device specified by the terminal device specifying unit,
wherein each of the at least one terminal device comprises:
a receiving unit that receives the image information and the sender information transmitted from the facsimile device; and
a reply unit that automatically prepares a response message and transmits the response message to the computer identified by the sender information, and
wherein each of the at least one computer comprises a receiving unit that receives the reply message transmitted from the terminal device.

8. The communication system according to claim 7, wherein the facsimile device further comprises a memory that stores device identification information identifying the facsimile device, and wherein the transmission unit transmits the image information with selective one of the sender information and the device identification information.

9. The communication system according to claim 7, wherein the transmission unit of the facsimile device transmits the image information with the sender information to both the computer identified by the sender information and the terminal device specified by the terminal device specifying unit.

10. The communication system according to claim 7, wherein the facsimile device further comprises a detection unit that detects transmission results of transmission after the image information with the user information is transmitted, a result information generating unit that generates result information based on the transmission results detected by the detection unit, and wherein the transmission unit further transmits the transmission results to the computer identified by the user information.

11. The communication system according to claim 7, wherein the image information generating unit is a scanner that reads image information from an original document, the user specifying unit is an operation panel that is manipulated by a user.

12. The communication system according to claim 7, wherein the facsimile device and the at least one computer are mutually connected to a network.

13. A medium storing a program of controlling a facsimile device, the program comprising the programs of;
designating a destination;
selecting one of sender information and device identification information, the sender information identifying a computer connected to the facsimile device, the device identification information identifying the facsimile device;
generating image information by reading an image from an original document using a scanner; and
transmitting the image information with the selective one of the sender information and the device identification information to the destination, wherein the sender information includes at least an electronic mail address of a sender.

14. The medium according to claim 13, wherein the program further comprises the program of transmitting the image information with the sender information to both the destination and the computer identified by the sender information.

15. The medium according to claim 13, wherein the program further comprises the program of detecting transmission results and transmitting the transmission results to the computer identified by the sender information.

16. A method of controlling a facsimile device, comprising the steps of:
specifying a remote destination using an operation panel provided to the facsimile device;
specifying a user of a computer connected to the facsimile device using the operation panel;
generating user information identifying the specified user, the user information including at least an electronic mail address of the user;
generating image information by reading an image from an original document using a scanner; and
transmitting the image information with the user information to both the specified remote destination and the user.

17. The method according to claim 16, further comprising the step of detecting transmission results and transmitting the transmission results of the user identified by the user information.

18. The method according to claim 16, wherein in the step of transmitting image information with the user information, the image information with the user information is transmitted as an e-mail message.

* * * * *